United States Patent
Matsumoto

(10) Patent No.: US 8,619,516 B1
(45) Date of Patent: Dec. 31, 2013

(54) THERMALLY-ASSISTED RECORDING (TAR) HEAD WITH CONDUCTIVE LAYER BETWEEN THE NEAR-FIELD TRANSDUCER AND THE WRITE POLE

(75) Inventor: Takuya Matsumoto, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/571,438

(22) Filed: Aug. 10, 2012

(51) Int. Cl.
G11B 11/00 (2006.01)

(52) U.S. Cl.
USPC ........................................... 369/13.33

(58) Field of Classification Search
USPC .................. 369/13.02, 13.13, 13.32, 13.33
See application file for complete search history.

(56) References Cited

U.S. PATENT DOCUMENTS

| | | |
|---|---|---|
| 6,649,894 B2 | 11/2003 | Matsumoto et al. |
| 6,768,556 B1 | 7/2004 | Matsumoto et al. |
| 7,272,079 B2 | 9/2007 | Challener |
| 7,969,826 B2 | 6/2011 | Naniwa et al. |
| 8,139,447 B2 | 3/2012 | Sasaki et al. |
| 8,351,307 B1 * | 1/2013 | Wolf et al. .................. 369/13.33 |
| 2004/0085862 A1 | 5/2004 | Matsumoto et al. |
| 2011/0096639 A1 | 4/2011 | Matsumoto |
| 2011/0170381 A1 | 7/2011 | Matsumoto |
| 2011/0235480 A1 | 9/2011 | Goulakov et al. |
| 2012/0163139 A1 * | 6/2012 | Vavra et al. ................. 369/13.33 |
| 2013/0107679 A1 * | 5/2013 | Huang et al. ................ 369/13.32 |

OTHER PUBLICATIONS

"Near-field light assisted magnetic recording head for ultra-high recording capacity", Seiko Instruments, Inc., published (undated) on the web at: http://www.sii.co.jp/info/eg/nfos1.html.
Ikkawi et al., "Near-Field Optical Transducer for Heat-Assisted Magnetic Recording for Beyond-10-Tbit/in2 Densities", J. Nanoelectron. Optoelectron. 2008, vol. 3, No. 1, pp. 44-54.

* cited by examiner

Primary Examiner — Brenda Bernardi
(74) Attorney, Agent, or Firm — Thomas R. Berthold

(57) ABSTRACT

A thermally-assisted recording (TAR) head for recording data in data tracks of a TAR disk is supported on an air-bearing slider and includes the magnetic write pole, a near-field transducer (NFT), an optical waveguide that directs laser light to the NFT, and an electrically conductive layer between and in contact with the NFT and the write pole. The NFT has an output tip having a generally triangularly-shaped end at the slider's air-baring surface (ABS). The electrically conductive layer is located between the NFT and the write pole and contacts both the NFT output tip and the write pole. The electrically conductive layer has a contact edge that is generally parallel with the ABS but recessed from the NFT output tip end and a cross-track width greater than the cross-track width of the NFT output tip end.

18 Claims, 9 Drawing Sheets

US 8,619,516 B1

THERMALLY-ASSISTED RECORDING (TAR) HEAD WITH CONDUCTIVE LAYER BETWEEN THE NEAR-FIELD TRANSDUCER AND THE WRITE POLE

TECHNICAL FIELD

This invention relates generally to a thermally-assisted recording (TAR) disk drive, in which data are written while the magnetic recording layer on the disk is at an elevated temperature, and more specifically to an improved TAR head.

BACKGROUND OF THE INVENTION

In conventional magnetic recording, thermal instabilities of the stored magnetization in the recording media can cause loss of recorded data. To avoid this, media with high magnetocrystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is thermally-assisted recording (TAR), also called heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive read head. TAR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed TAR disk drive uses a laser source and an optical waveguide coupled to a near-field transducer (NFT) for heating the recording material on the disk. A "near-field" transducer refers to "near-field optics", wherein the passage of light is through an element with subwavelength features and the light is coupled to a second element, such as a substrate like a magnetic recording medium, located a sub-wavelength distance from the first element. The NFT is typically located at the air-bearing surface (ABS) of the air-bearing slider that also supports the read/write head and rides or "flies" above the disk surface.

A NFT with a generally triangular output end is described in US published applications 20110096639 and 20110170381, both assigned to the same assignee as this application. In this NFT an evanescent wave generated at a surface of the waveguide couples to surface plasmons excited on the surface of the NFT 74 and a strong optical near-field is generated at the apex of the triangular output end.

What is needed is a TAR head with improved efficiency of the NFT so as to reduce the required laser power.

SUMMARY OF THE INVENTION

A thermally-assisted recording (TAR) head for recording data in data tracks of a TAR disk is supported on an air-bearing slider and includes the magnetic write pole, a near-field transducer (NFT), an optical waveguide that directs laser light to the NFT, and an electrically conductive layer between and in contact with the NFT and the write pole. The NFT has a surface parallel to and spaced from the waveguide and an output tip having an end at the slider's air-baring surface (ABS). The output tip end is located on the along-the-track axis between the waveguide and the tip of the write pole and has a generally triangular shape with an apex facing and spaced from the write pole tip. An electrically conductive layer is located between the NFT and the write pole and contacts both the NFT output tip and the write pole. The electrically conductive layer has a contact edge that is generally parallel with the ABS but recessed from the NFT output tip end and a cross-track width greater than the cross-track width of the NFT output tip end. The electrically conductive layer may overlap the output tip to a depth in the along-the-track direction. The electrically conductive layer allows for a reduction in laser power, and also reduces the temperature rise of the NFT, which can cause undesirable thermal protrusion of the NFT and possible damage to the NFT.

For a fuller understanding of the nature and advantages of the present invention, reference should be made to the following detailed description taken together with the accompanying figures.

DETAILED DESCRIPTION OF THE INVENTION

Figure 1:
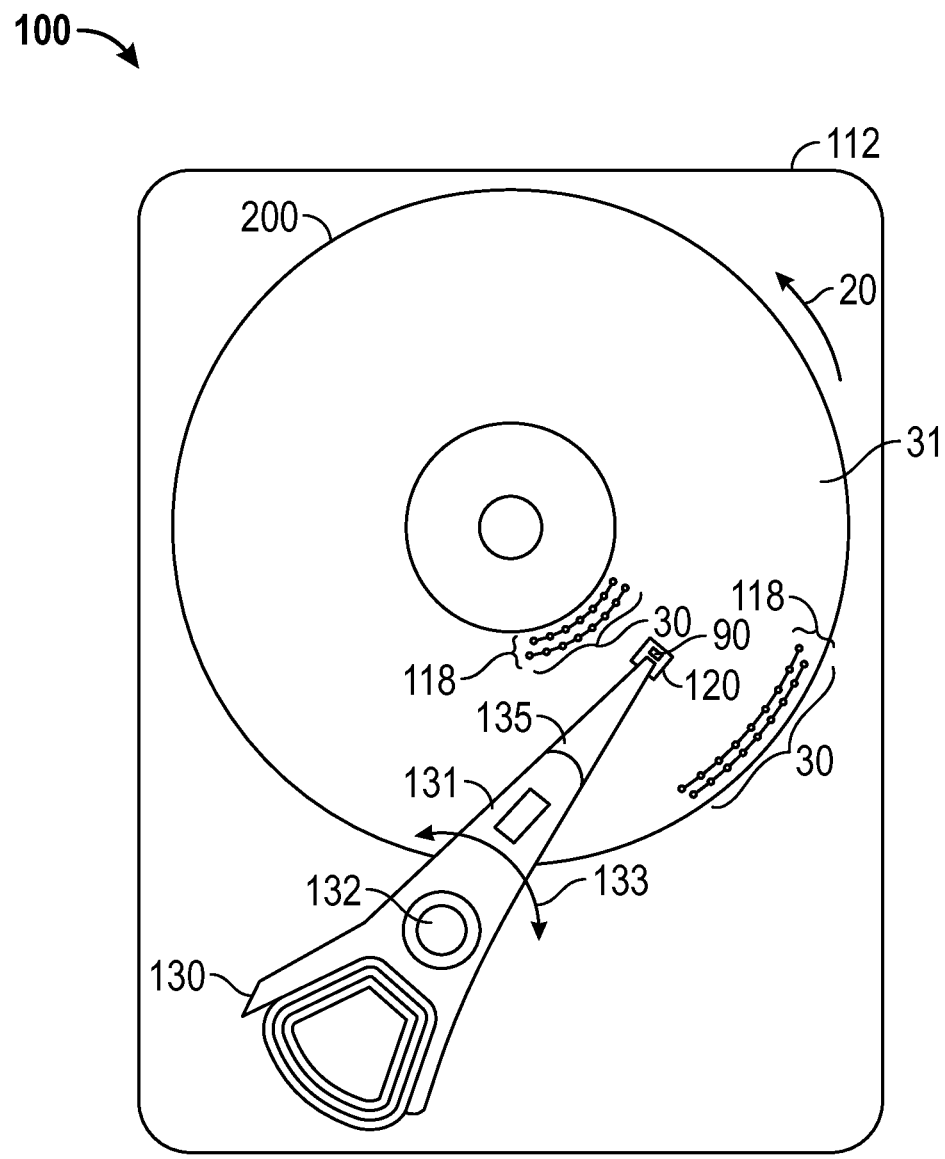
FIG. 1 is a top view of a thermally-assisted recording (TAR) disk drive applicable with the TAR head according to this invention.

FIG. 1 is a top view of a thermally-assisted recording (TAR) disk drive 100 applicable for use with the TAR head of this invention. In FIG. 1, the TAR disk drive 100 is depicted with a disk 200 with magnetic the recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the TAR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the TAR head (not shown), which includes a magnetoresistive read head, an inductive write head, the near-field transducer (NFT) and optical waveguide. A semiconductor laser 90 with a wavelength of 780 to 980 nm may used as the TAR light source and is depicted as being supported on the top of slider 120. Alternatively the laser may be located on suspension 135 and coupled to slider 120 by an optical channel. As the disk 200 rotates in the direction of arrow 20, the movement of actuator 130 allows the TAR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and TAR head associated with each surface of each disk.

Figure 2:
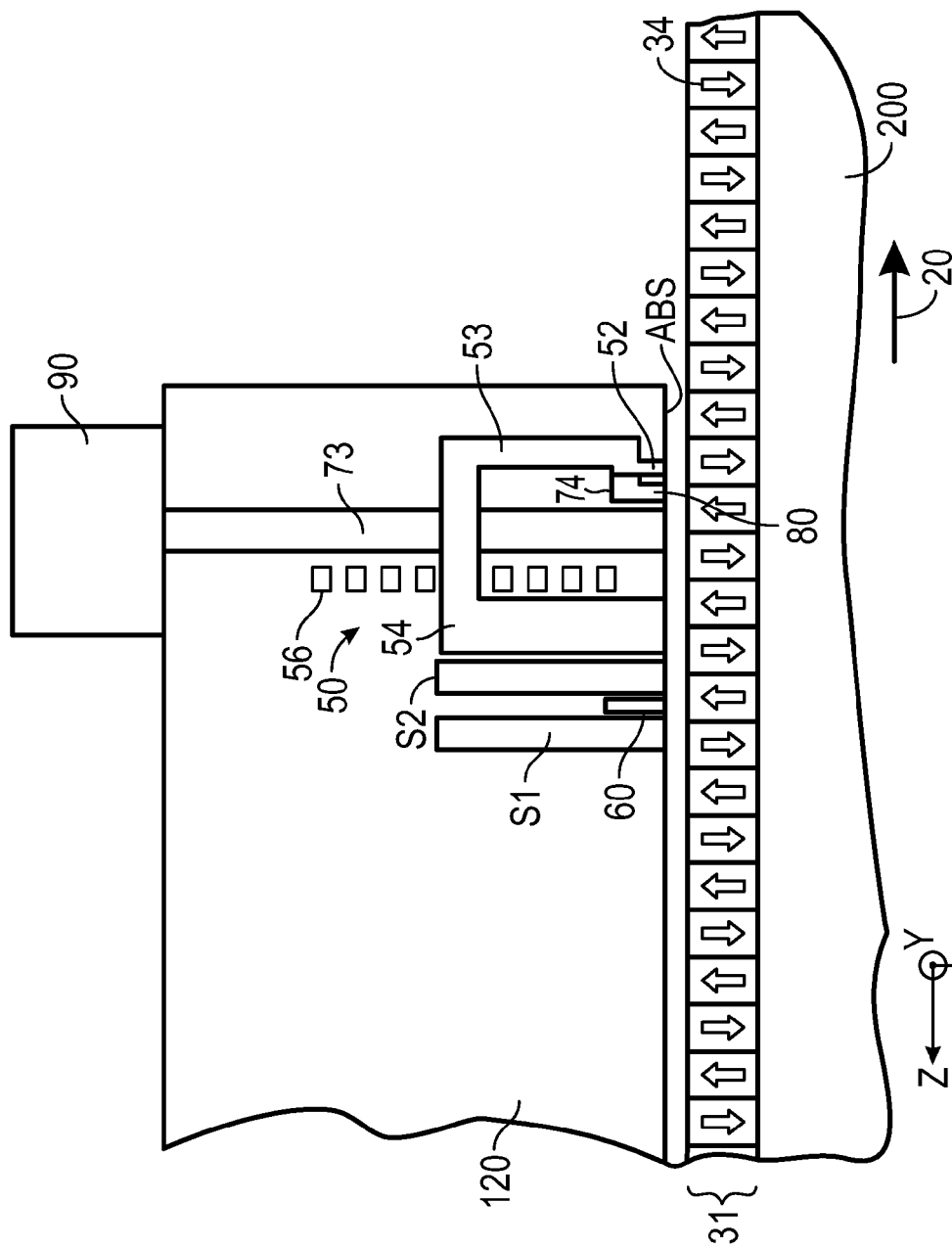
FIG. 2 depicts a sectional view, not drawn to scale because of the difficulty in showing the very small features, of an air-bearing slider for use in TAR disk drive and a portion of a TAR disk according to the prior art.

In the following drawings, the X direction denotes a direction perpendicular to the air-bearing surface (ABS) of the slider, the Y direction denotes a track width or cross-track direction, and the Z direction denotes an along-the-track direction. FIG. 2 is a schematic cross-sectional view illustrating a configuration example of a TAR head according to the prior art. In FIG. 2, the disk 200 is depicted with the recording layer 31 being a conventional continuous magnetic recording layer of magnetizable material with magnetized regions or "bits" 34. The air-bearing slider 120 is supported by suspension 135 and has an ABS that faces the disk 200 and supports the magnetic write head 50, read head 60, and magnetically permeable read head shields S1 and S2. A recording magnetic field is generated by the write head 50 made up of a coil 56, a magnetic pole 53 for transmitting flux generated by the coil 56, a main pole 52, and a return pole 54. A magnetic field generated by the coil 56 is transmitted through the magnetic pole 53 to the main pole 52 arranged in a vicinity of an optical near-field transducer (NFT) 74. At the moment of recording, the recording layer 31 of disk 200 is heated by an optical near-field generated by the NFT 74 and, at the same time, a region or "bit" 34 is magnetized and thus written onto the recording layer 31 by applying a recording magnetic field generated by the main pole 52. The disk 200 may optionally include a soft magnetically permeable underlayer (SUL) below the recording layer 31 for directing the magnetic flux from the write pole 52 to the return pole 54.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide. A multi-mode waveguide is not preferred because it may cause power fluctuations due to intermode interference.

Figure 3:
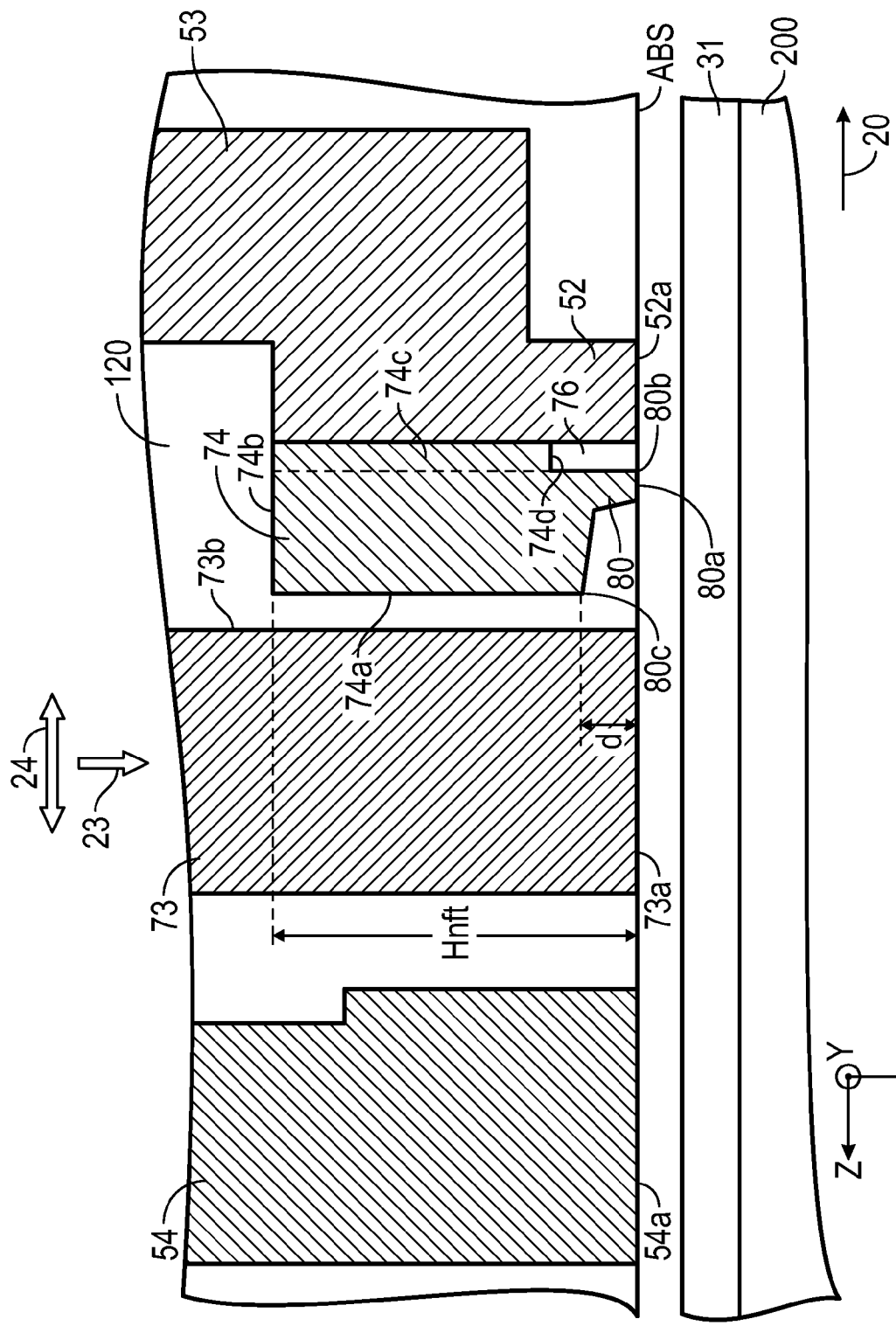
FIG. 3 is a side sectional view of the slider showing the layers of material making up the write pole, the near-field transducer (NFT), and the waveguide, with a conductive layer between the NFT and the write pole in a TAR head according to the prior art.

FIG. 3 is a side sectional view of the slider 120 showing the layers of material making up the write pole 52, the NFT 74, waveguide 73, and return pole 54 and shown in relation to disk 200 with recording layer 31. In FIG. 3, the unshaded regions of slider 120 are typically formed of insulating material like alumina ($Al_2O_3$). The write pole 52 is typically a layer of high-moment material like FeCo and has a pole tip 52a at the ABS. The waveguide 73 is a layer of core material generally parallel to the write pole 52 layer with a length orthogonal to the ABS, an end 73a at the ABS and a generally planar surface 73b that faces and is parallel to the layer of material making up NFT 74.

The NFT 74 layer is a conductive low-loss metal (preferably Au, but also Ag, Al, or Cu or alloys of Au, Ag, Al or Cu), is generally parallel to waveguide 73 layer. The NFT 74 is located between the waveguide 73 layer and the write pole 52 layer and is in contact with the write pole layer 52. The NFT 74 layer has a surface 74a that faces, is parallel to and spaced from waveguide surface 73b. The NFT 74 layer has an output tip 80 with an end at the ABS and height $H_{nft}$ from the ABS to an input edge 74b recessed from the ABS, where $H_{nft}$ is typically between about 500 and 1000 nm. The thickness (Z-direction) of the NFT 74 layer depends on the material selected for the NFT 74, but is typically between 60 and 120 nm. In one type of NFT the output tip 80 has a generally triangularly shaped output end 80a with an apex 80b that faces the write pole tip 52a and a back edge 80c that faces the waveguide surface 73b. The back edge 80c is substantially at the ABS. The back edge may have a shallow recess "d" from the ABS, where d is between 0 (no recess) and 30 nm, and preferably between about 4 and 10 nm. The NFT layer 74 also includes a portion 74c (shown by a dashed line) that is in contact with the write pole layer 52. The NFT portion 74c has a lower edge 74d that is recessed from the ABS and is not in contact with the NFT output tip 80. The NFT portion 74b creates an along-the-track (Z-direction) gap 76 between the output tip 80 and the write pole layer 52. The prior art TAR head depicted in FIG. 3 is shown and described in published application US 2011/0170381 A1, assigned to the same assignee as this application.

When light is introduced into the waveguide 73, an evanescent wave is generated at the waveguide surface 73b and couples to a surface plasmon excited on the surface 74a of NFT 74. Arrow 23 shows the direction of propagation of light in waveguide 73 and arrow 24 shows the direction of polarization of the light. The surface plasmon propagates to the NFT output end 80a. At the apex 80b an optical near-field spot is generated in the space at the ABS between the output end apex 80b and the write pole tip 52a. The write pole tip 52a applies a magnetic field at the optical spot. In one example, the distance S between the apex 80b and the write pole tip 52a is about 20 nm.

Figure 4:
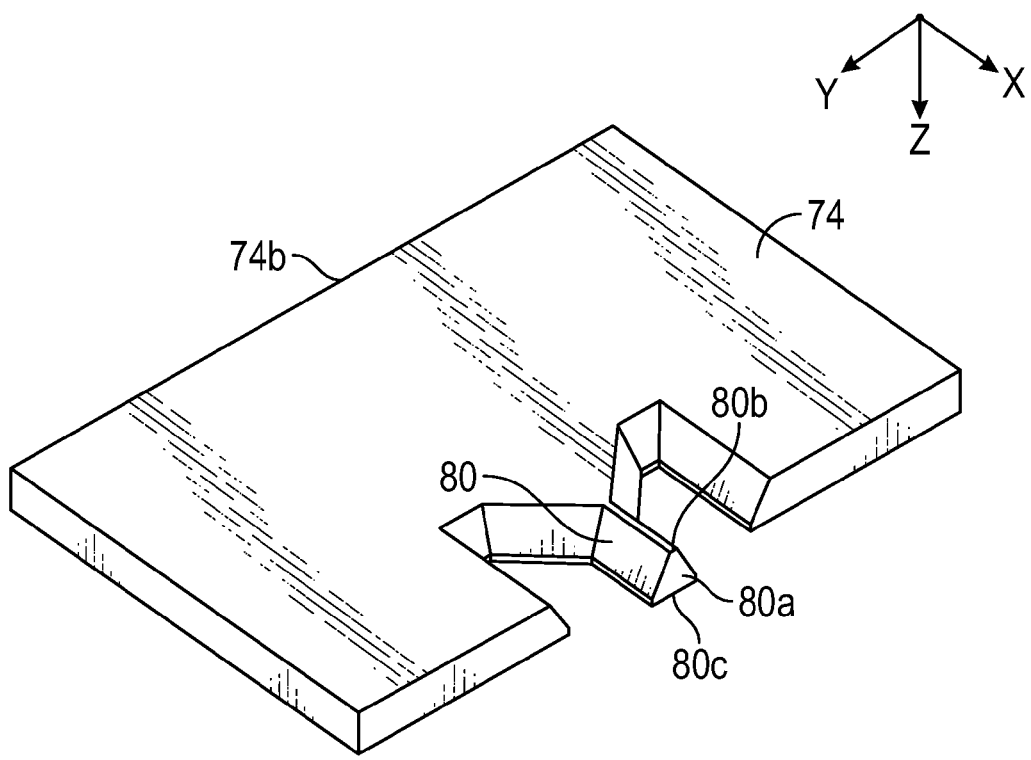
FIG. 4 is a perspective view of the NFT with the triangular output tip and without the second conductive layer of this invention.

FIG. 4 is a perspective view of the NFT 74 with the triangular output tip 80 having an end 80a at the ABS. The output end 80a has an apex 80b and a back edge 80c.

In this invention a "second" electrically conductive layer is located between the conductive layer which generates the optical near-field (the NFT 74 or the "first" conductive layer) and the write pole to increase the optical near-field intensity. This reduces the required laser power. The second conductive layer is located on and in contact with the NFT 74 and the NFT output tip 80 and is also in contact with the write pole.

Figure 5:
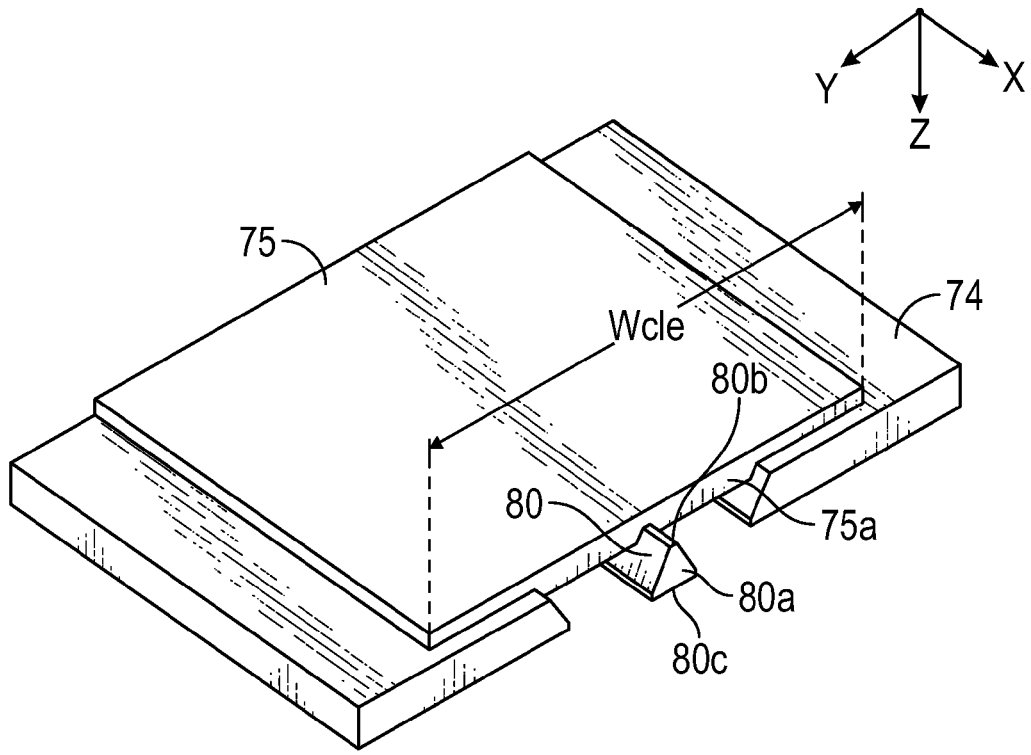
FIG. 5 is a perspective view of the NFT showing the second conductive layer in contact with the triangular output tip of the NFT with the second conductive layer contact edge having a cross-track width greater than the cross-track width of the apex of the output tip according to the invention.

FIG. 5 is a perspective view of the NFT 74 of FIG. 4 but with the second conductive layer 75 on and in contact with the NFT 74 and the output tip 80. The second conductive layer 75 is also an electrically conductive metallic material, e.g., Au, Ag, Al, or Cu or their alloys. The second conductive layer 75 and the NFT 74 may be formed of different materials or the same material, in which case the NFT 74 and second conductive layer 75 may be an integral single-piece structure. The material of the second conductive layer may be different from the material of the NFT 74. For example, the second conductive layer may be formed of Rh, Ti, Cr, Mo, Fe, Co, Ni or their alloys. The material of the second conductive layer may be a ferromagnetic magnetic, such as FeCo or CoNiFe alloys. The use of ferromagnetic material may increase the magnetic field intensity at the recording point of the media.

Figure 6:
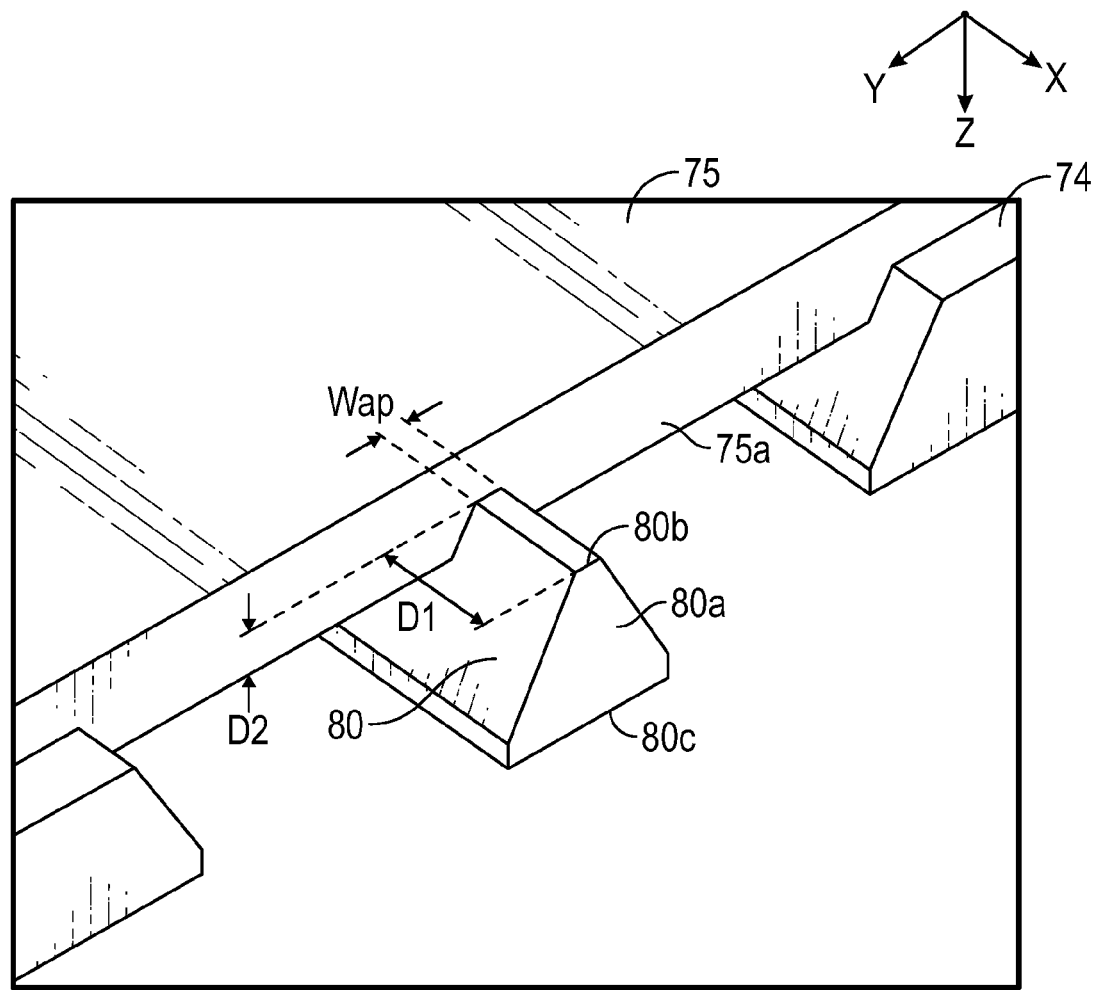
FIG. 6 is an enlarged view showing the NFT output tip and the second conductive layer and illustrates the amount of recession D1 of the conductive layer edge and the depth D2 of overlap of the conductive layer with the NFT output tip.

The second conductive layer has a contact edge 75a that is recessed from the NFT output end 80a and has a cross-track width $W_{cle}$ wider than the cross-track width of apex 80b. FIG. 5 also illustrates that the second conductive layer 75 extends to a depth in the along-the-track direction (Z-direction) over the apex 80b of output tip 80. FIG. 6 is an enlarged view showing the relationship of the NFT output tip 80 and the second conductive layer 75. The conductive layer contact edge 75a has a recession D1 from output end 80a and overlaps apex 80b to a depth D2. The thickness (Z-direction) of the NFT 74 depends on the material selected for the NFT, but is typically between 60 and 120 nm. The overlap depth D2 must be less than the thickness of the NFT 74. However, the second conductive layer 75 does not have to overlap the apex 80b, provided it is contact with the apex 80b (i.e., D2=0). The contact edge 75a is wider in the cross-track direction than the apex 80b, which has a cross-track width $W_{ap}$. $W_{ap}$ is preferably between about 5 and 30 nm.

Figure 7:
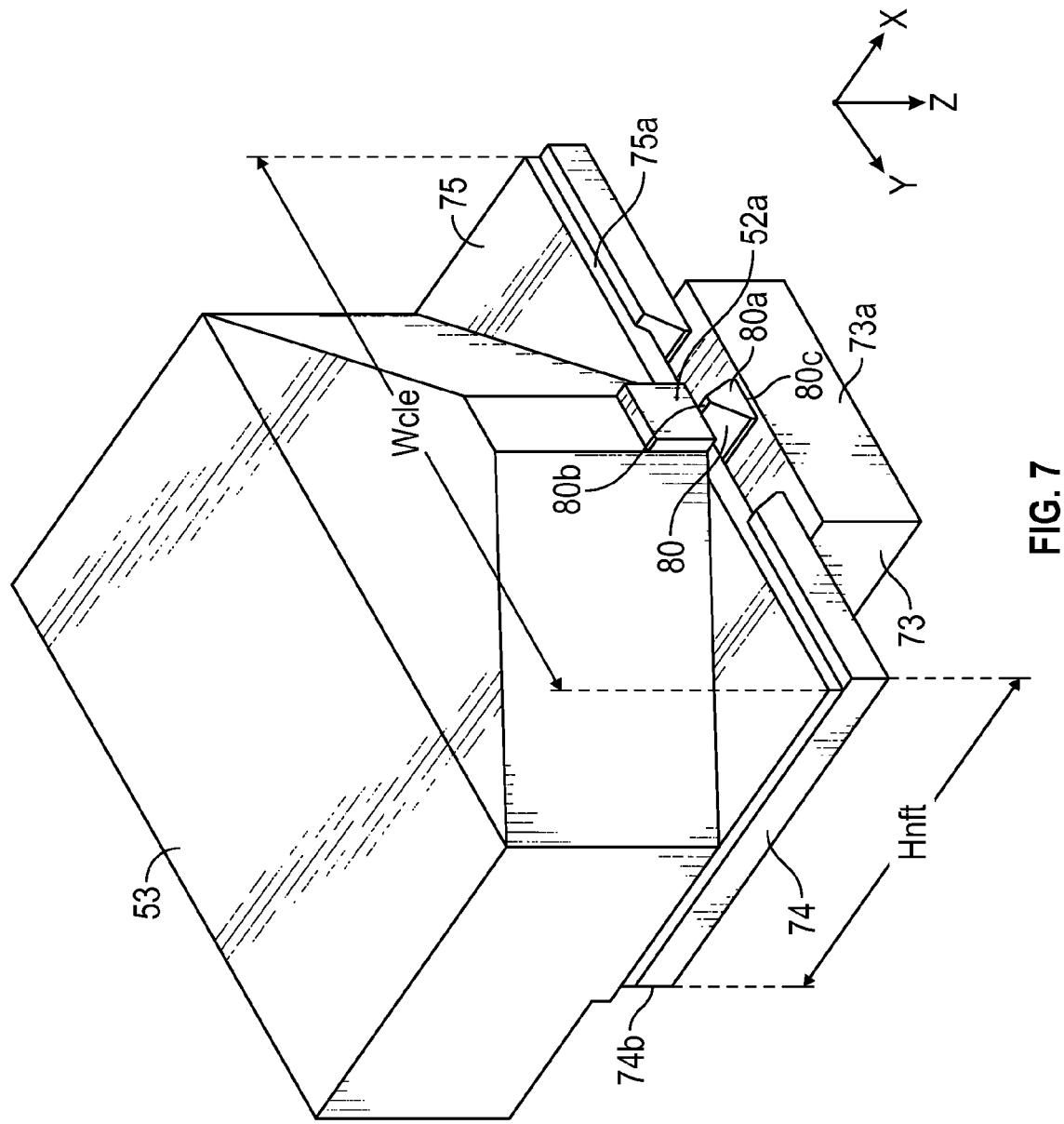
FIG. 7 is a perspective view of a portion of the slider showing the relative orientations of the waveguide, the NFT output tip, the write pole tip and the conductive layer between and in contact with the NFT output tip and the write pole in the TAR head according to the invention.

FIG. 7 is a perspective view of a portion of the slider showing the NFT 74 and second conductive layer 75 relative to the waveguide 73 and write pole 53 in the TAR head according to the invention. The second conductive layer 75 is located between and in contact with both the NFT 74 and the write pole 53.

Figure 8A:
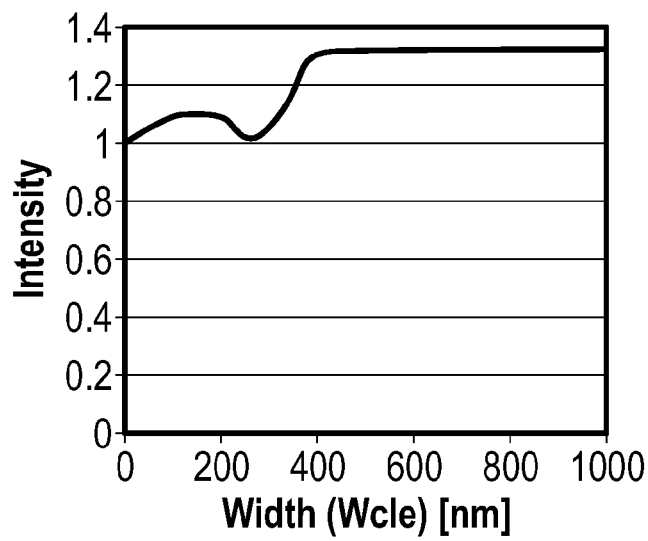
FIG. 8A is a graph of the optical near-field intensity as a function of the width $W_{cle}$ of the contact edge of the second conductive layer shown in FIG. 5.

FIG. 8A is a graph of the optical near-field intensity as a function of the width $W_{cle}$ of the contact edge 75a of the second conductive layer 75 shown in FIG. 5 for an example where the apex 80b width $W_{ap}$ was 16 nm. The intensity was normalized to the intensity when there was no second conductive layer. The optical near-field intensity is enhanced to 1.3 times the normalized intensity when $W_{cle}$ is greater than about 400 nm, which is about 25 times the apex width. The near-field intensity is increased when W is greater than $W_{ap}$. While it is preferable to have the width $W_{cle}$ be greater than about 400 nm, the near-field intensity is still is enhanced if it is less than about 400 nm, provided $W_{cle}$ is greater than $W_{ap}$.

Figure 8B:
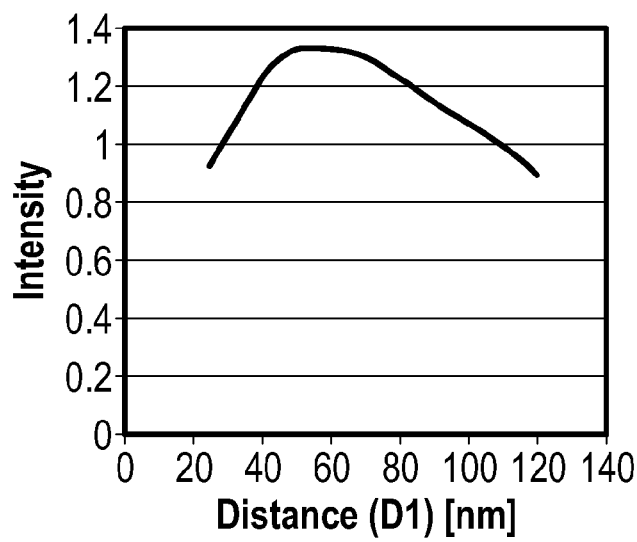
FIG. 8B is a graph of the optical near-field intensity as a function of the recession distance D1 of the contact edge of the second conductive layer from the output end of the NFT.

FIG. 8B is a graph of the optical near-field intensity as a function of the recession distance D1 of the contact edge 75a from the output end 80a for an example where $W_{cle}$ was 1000 nm. As shown, the optical near-field intensity is enhanced when D1 is between about 30 nm and 110 nm.

Figure 8C:
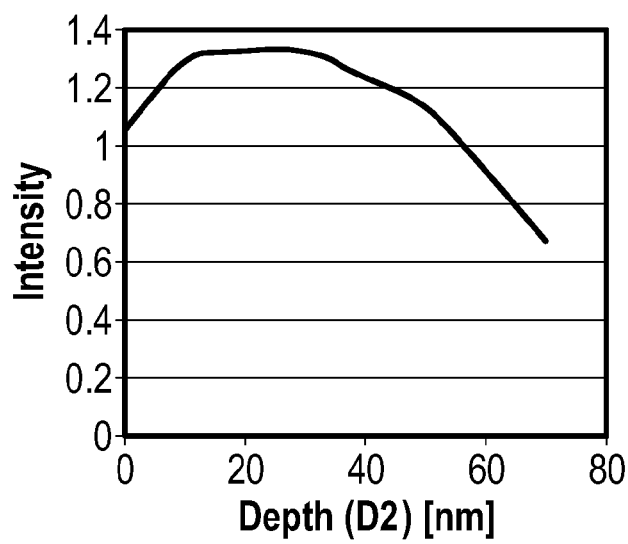
FIG. 8C is a graph of the optical near-field intensity as a function of the depth of overlap D2 of the contact edge of the second conductive layer over the NFT output tip.

The second conductive layer 75 may overlap the output tip 80 to a depth D2 as shown in FIG. 6, or may just be in contact with the output tip 80, in which case D2=0. FIG. 8C is a graph of the optical near-field intensity as a function of the depth of overlap D2 of the contact edge 75a. As shown, the optical near-field intensity is enhanced when D2 is greater than or equal to zero and less than about 60 nm. The total thickness (the Z-direction) of conductive layer 75 is preferably between about 20 and 100 nm.

Figure 9:
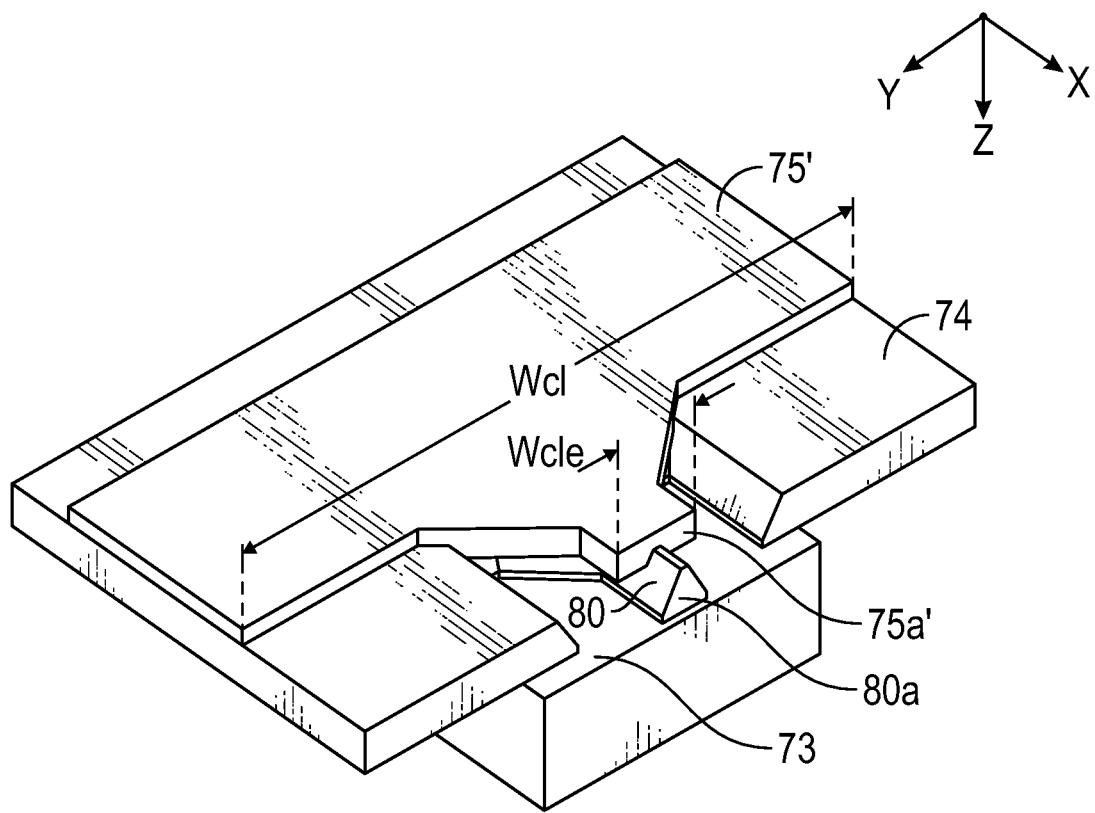
FIG. 9 is a perspective view of a modification of the second conductive layer with a tapered region having a contact edge that has a cross-track width $W_{cle}$ less than the width $W_{cl}$ of the second conductive layer at a region recessed from the tapered region.

FIG. 9 shows a modification of the shape of the second conductive layer. In this example the second conductive layer 75' has a width $W_{cl}$ at a region recessed from the ABS and a tapered region with a contact edge 75a' that has a cross-track width $W_{cle}$ less than $W_{cl}$.

Figure 10:
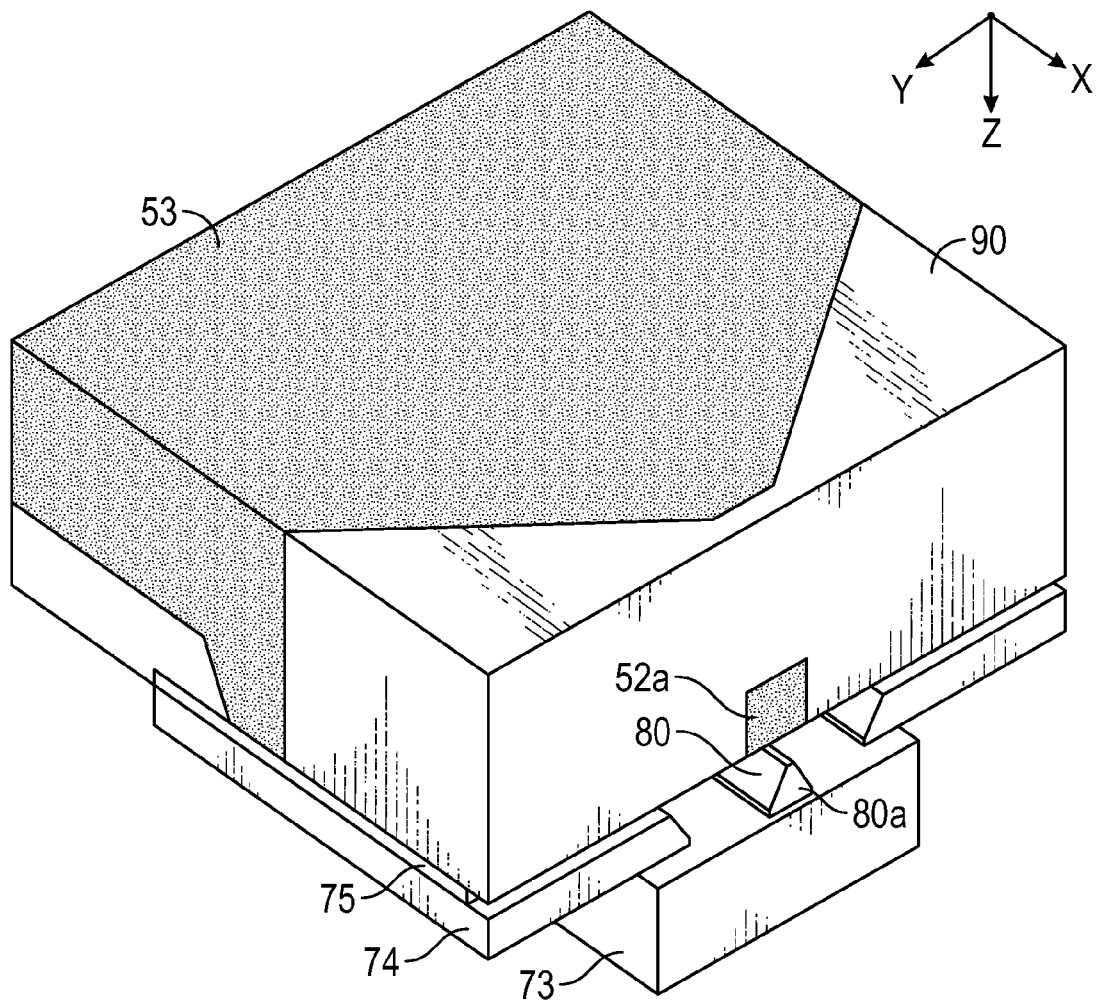
FIG. 10 is a perspective view of a TAR head according to the invention with heat sink material in contact with the second conductive layer and surrounding and in contact with write pole.

The second conductive layer also functions as a heat sink to reduce the temperature rise of the NFT. This can reduce protrusion of the NFT end 80a and the write pole tip 52a. To reduce the temperature rise further, additional heat sink material may surround the write pole. FIG. 10 shows heat sink material 90 in contact with second conductive layer 75 and surrounding and in contact with write pole 53. The heat sink material 90 may be formed of a material selected from Cr, Au, Ag, Pt, Rh, W, Ru and their alloys. The heat generated at the NFT 74 flows into the heat sink layer 90 around the write pole 53 pole through the second conductive layer 75. Thus the temperature rise at the NFT is reduced.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted recording (TAR) head for writing to a magnetic recording layer on a magnetic recording disk comprising:

an air-bearing slider having an air-bearing surface (ABS) for facing the magnetic recording layer on the disk, the ABS having an along-the-track axis and a cross-track axis orthogonal to the along-the-track axis;

a write pole on the slider and having a tip at the ABS on the along-the-track axis;

an optical waveguide on the slider having a thickness in the along-the-track axis direction and a surface oriented generally orthogonal to the along-the-track axis;

a near-field transducer (NFT) on the slider between the optical waveguide and the write pole, the NFT having a surface parallel to and spaced from said waveguide surface and an output tip having an end at the ABS, the output tip end being located on the along-the-track axis between the waveguide and the write pole tip and having a generally triangular shape with an apex facing and spaced from the write pole tip; and an electrically conductive layer between the NFT and the write pole and contacting the NFT output tip and the write pole, the electrically conductive layer having an edge generally parallel with the ABS, said conductive layer edge being recessed from the NFT output tip end b a distance D1 greater than or equal to 30 nm and less than or equal to 110 nm and having a cross-track width greater than the cross-track width of the NFT output tip end.

2. The TAR head of claim 1 wherein the NFT consists essentially of a material selected from Au, Ag, Al, Cu, and alloys thereof.

3. The TAR head of claim 2 wherein the electrically conductive layer is formed of the same material as the NFT and is integral with the NFT.

4. The TAR head of claim 1 wherein the electrically conductive layer is formed of a ferromagnetic material.

5. The TAR head of claim 1 wherein said conductive layer is in contact with the NFT output tip to a depth D2 of the NFT output tip in the along-the-track direction, wherein D2 is less than or equal to 60 nm.

6. The TAR head of claim 1 wherein the apex of the NFT output tip end has a cross-track width between 5 and 30 nm and wherein said conductive layer edge has a cross-track width greater than 400 nm.

7. The TAR head of claim 1 wherein said conductive layer edge has a cross-track width $W_{cle}$ and wherein said conductive layer has a cross-track width $W_d$ greater than $W_{cle}$ at a region recessed from said conductive layer edge.

8. The TAR head of claim 1 further comprising heat sink material in contact with said conductive layer and said write pole.

9. A thermally-assisted recording (TAR) disk drive comprising:
    the TAR head of claim 1;
    a laser for directing light to the waveguide; and
    a magnetic recording disk having a magnetic recording layer.

10. The TAR disk drive of claim 9 wherein the magnetic recording layer is patterned into generally concentric tracks containing discrete islands of magnetic material.

11. A thermally-assisted recording (TAR) head for writing to a magnetic recording layer on a magnetic recording disk comprising:
    an air-bearing slider having an air-bearing surface (ABS) for facing the magnetic recording layer on the disk, the ABS having an along-the-track axis and a cross-track axis orthogonal to the along-the-track axis;
    a write pole on the slider and having a tip at the ABS on the along-the-track axis;
    an optical waveguide on the slider having a thickness in the along-the-track axis direction and a surface oriented generally orthogonal to the along-the-track axis;
    a near-field transducer (NFT) on the slider between the optical waveguide and the write pole, the NFT having a surface parallel to and spaced from said waveguide surface and an output tip having an end at the ABS, the output tip end being located on the along-the-track axis between the waveguide and the write pole tip and having a generally triangular shape with an apex facing and spaced from the write pole tip; and
    an electrically conductive layer between the NFT and the write pole and contacting the NFT output tip and the write pole, the electrically conductive layer having a contact edge generally parallel with the ABS, said conductive layer contact edge having a cross-track width greater than the cross-track width of the apex of the NFT output tip end, said conductive layer contact edge being recessed from the NFT output tip end by a distance D1 and overlapping the NFT output tip to a depth D2 in the along-the-track direction, wherein D1 is greater than or equal to 30 nm and less than or equal to 110 nm and D2 is less than or equal to 60 nm.

12. The TAR head of claim 11 wherein the NFT consists essentially of a material selected from Au, Ag, Al, Cu, and alloys thereof.

13. The TAR head of claim 12 wherein the electrically conductive layer is formed of the same material as the NFT and is integral with the NFT.

14. The TAR head of claim 11 wherein the electrically conductive layer is formed of a ferromagnetic material.

15. The TAR head of claim 11 wherein the apex of the NFT output tip end has a cross-track width between 5 and 30 nm and wherein said conductive layer edge has a cross-track width greater than 400 nm.

16. The TAR head of claim 11 wherein said conductive layer contact edge has a cross-track width $W_{cle}$ and wherein said conductive layer has a cross-track width $W_{cl}$ greater than $W_{cle}$ at a region recessed from said conductive layer contact edge.

17. The TAR head of claim 11 further comprising heat sink material in contact with said conductive layer and said write pole.

18. A thermally-assisted recording (TAR) head for writing to a magnetic recording layer on a magnetic recording disk comprising:
    an air-bearing slider having an air-bearing surface (ABS) for facing the magnetic recording layer on the disk, the ABS having an along-the-track axis and a cross-track axis orthogonal to the along-the-track axis;
    a write pole on the slider and having a tip at the ABS on the along-the-track axis;
    an optical waveguide on the slider having a thickness in the along-the-track axis direction and a surface oriented generally orthogonal to the along-the-track axis;
    a near-field transducer (NFT) on the slider between the optical waveguide and the write pole, the NFT having a surface parallel to and spaced from said waveguide surface and an output tip having an end at the ABS, the output tip end being located on the along-the-track axis between the waveguide and the write pole tip and having a generally triangular shape with an apex facing and spaced from the write pole tip; and
    an electrically conductive layer between the NFT and the write pole and contacting the NFT output tip and the write pole, the electrically conductive layer having an edge generally parallel with the ABS, said conductive layer edge being recessed from the NFT output tip end and having a cross-track width greater than the cross-track width of the NFT output tip end, said conductive layer being in contact with the NFT output tip to a depth D2 of the NFT output tip in the along-the-track direction, wherein D2 is less than or equal to 60 nm.

* * * * *